(12) United States Patent
Schlenoff

(10) Patent No.: US 7,105,052 B1
(45) Date of Patent: Sep. 12, 2006

(54) ORDERED ARRAY OF MAGNETIZED NANORODS AND ASSOCIATED METHODS

(75) Inventor: Joseph B. Schlenoff, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 357 days.

(21) Appl. No.: 10/799,182

(22) Filed: Mar. 12, 2004

Related U.S. Application Data

(60) Provisional application No. 60/455,349, filed on Mar. 17, 2003.

(51) Int. Cl.
*C30B 1/00* (2006.01)
*C12N 15/85* (2006.01)

(52) U.S. Cl. .............................. 117/68; 117/69; 117/70; 117/939; 435/459; 435/471

(58) Field of Classification Search .................. 117/68, 117/69, 70, 939; 435/459, 471
See application file for complete search history.

(56) References Cited

U.S. PATENT DOCUMENTS

| | | | |
|---|---|---|---|
| 2002/0034827 A1* | 3/2002 | Singh et al. | 436/177 |
| 2003/0215865 A1* | 11/2003 | Mayer et al. | 435/6 |
| 2004/0203071 A1* | 10/2004 | Chase et al. | 435/7.1 |
| 2005/0101020 A1* | 5/2005 | Salem et al. | 435/459 |
| 2005/0277205 A1* | 12/2005 | Lee et al. | 436/526 |
| 2005/0281682 A1* | 12/2005 | Paxton et al. | 417/53 |

* cited by examiner

*Primary Examiner*—Robert Kunemund
(74) *Attorney, Agent, or Firm*—Allen, Dyer, Doppelt, Milbrath & Gilchrist, P.A.

(57) ABSTRACT

An ordered array of magnetized nanorods includes a plurality of metallic nanorods generally cylindrical in shape and including a nickel portion coated with a positively charged polyelectrolyte and a gold portion coated with an alkanethiolate; and a layer of a hardened polymer wherein each individual nanorod of the plurality is held by having said gold portion embedded therein so that the nickel portion extends approximately perpendicularly away from the layer of hardened polymer, and wherein said plurality of metallic nanorods is ordered in the array by having substantially all individual nanorods of the plurality of nanorods oriented generally parallel to each other.

76 Claims, 5 Drawing Sheets

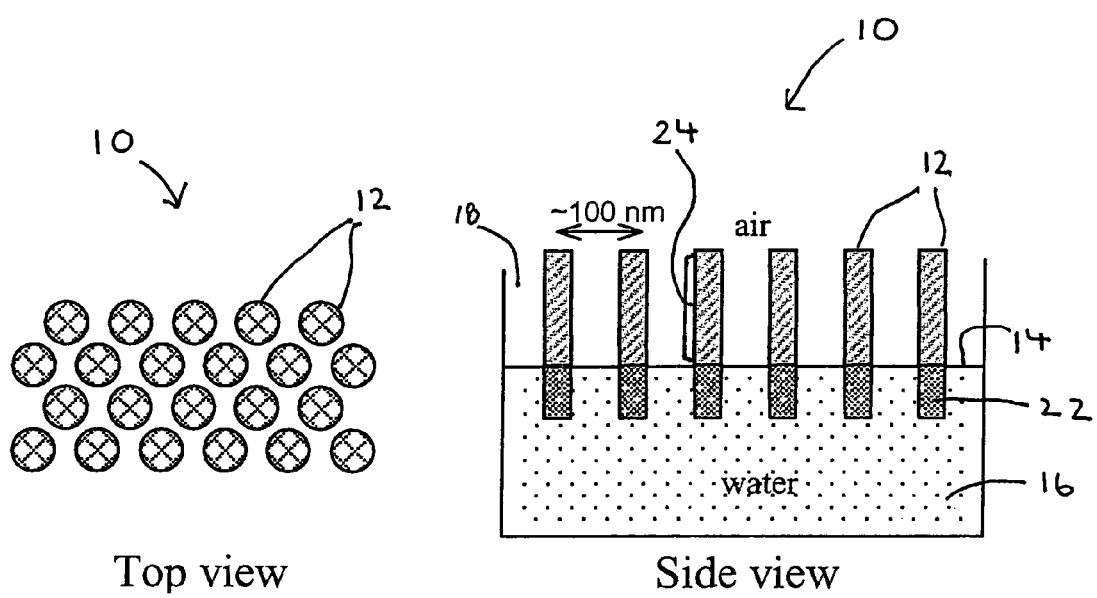
Figure 1. Views of nanorod array

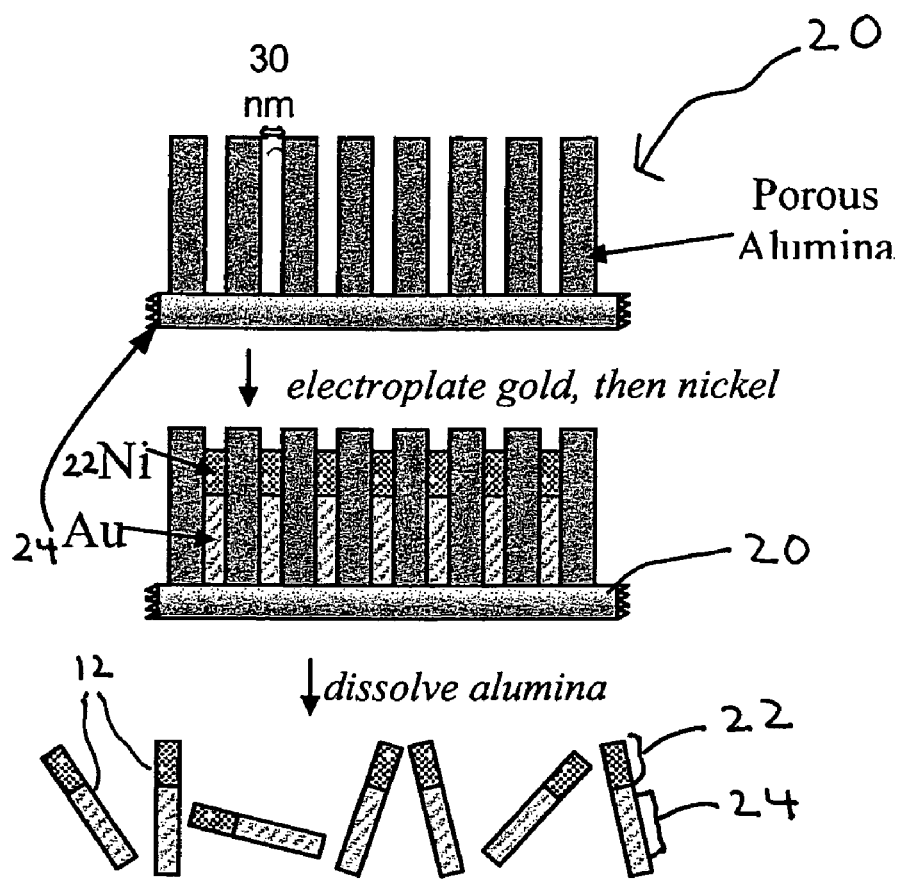
Figure 2. Templated electrodeposition of nanorods.

Figure 3. Electron micrograph of 200 nm diameter Ni nanorods.

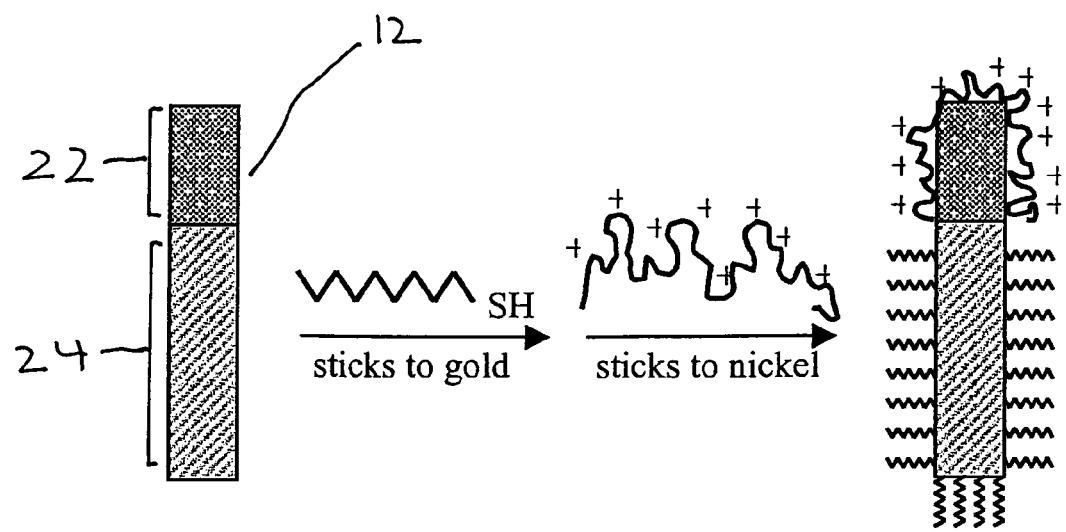
Figure 4. Derivatization of nanorods.

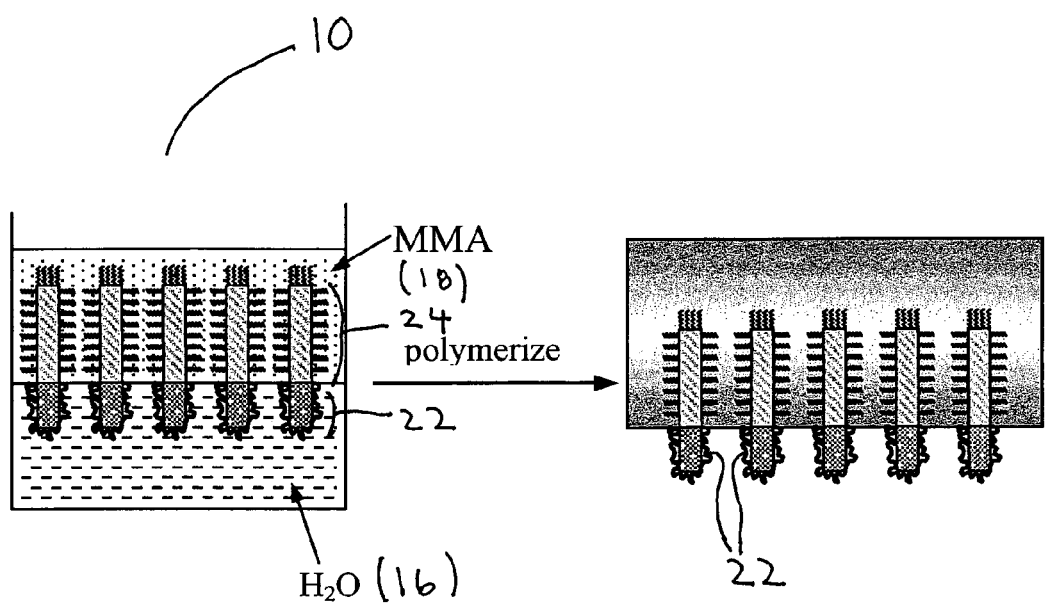
Figure 5. Immobilization of interfacial nanorods

ORDERED ARRAY OF MAGNETIZED NANORODS AND ASSOCIATED METHODS

RELATED APPLICATION

This application claims priority from co-pending provisional application Ser. No. 60/455,349, which was filed on Mar. 17, 2003, and which is incorporated herein by reference in its entirety.

FIELD OF THE INVENTION

The present invention relates to the field of magnetic media and, more particularly, to an ordered array of magnetized nanorods and its associated methods.

BACKGROUND OF THE INVENTION

Thin films of magnetic materials are important in mass data storage technology. Today's best "hard drives" are able to store approximately 100 Gbytes of information on a 3.5 inch (double-side) disk. Such a density corresponds to $4.2 \times 10^{10}$ bits per $in^2$ or a bit size of about 120 nm. Each bit is a magnetic domain, often a particle, capable of being magnetized in a certain direction for future readout. Magnetic disk technology (and other areas, including VLSI fabrication with ever decreasing line widths) faces some "physics-dictated" (rather than technique-dictated) limits. Specifically, when magnetic domains become too small, any alignment of spins by an external magnetic field is lost when the field is removed. At this superparamagnetic/ferromagnetic limit (which corresponds to a characteristic size of about 10 nm for Ni at room temperature) because the domains/particles are no longer able to sustain a permanent magnetic dipole (ferromagnetism), the material is not useful for magnetic storage.

One method to push the superparamagnetic limit beyond the $10 \times 10^{10}$ bits per $in^2$ barrier is to prepare "perpendicular" media, where anisotropic bits are magnetized perpendicular to the surface. Such highly anisotropic high aspect ratio particles exhibit perpendicular ferromagnetic behavior at diameters less than a spherical particle of the same diameter. This property permits a denser packing of ferromagnetic particles in the plane of the recording medium (i.e. a greater storage density). Other storage density advantages accrue from the fact that the particles will be also uniform in size and distribution. Uniformity in size means that no particle will be below the ferromagnetic limit.

Noteworthy advantages will be realized from the readout perspective. Small currents are induced in the readout head as it passes over magnetized bits. Relatively uniform spacing helps to ensure uniformity in readout current. The read head will encounter one identical particle, with predictable response, at a time, instead of various-size clumps of particles. A final significance of the disclosed magnetic material is also related to read-out: in order to be able to read individual bits, the read head must approach the disk surface as closely as possible, a requirement which is, itself, a challenge in lubrication (to prevent crashes). Anisotropy in the read head response and in the magnetic field of the particles are refinements which permit detection of closely-spaced bits. Rodlike particles, oriented and magnetized as described below, provide enhanced magnetization in the direction perpendicular to the disk surface, which facilitates readout. It is estimated that the advantages above, when taken in totality, will lead to an improvement in storage density of at least a factor of ten.

An array of uniform, high aspect-ratio rods has many potential applications other than magnetic storage. It is extremely difficult to produce uniform "columns" by photolithography. Tall features are subject to undercutting during the etching phase. While hairlike nanostructures, such as carbon nanotubes, may be grown from surfaces, they are not arranged in an array pattern. In addition, the nanorod arrays herein disclosed may be used as "masters" for preparing arrays of holes in softer materials, either by microcontact stamping or by molding (e.g. with rubbery polymers such as polydimethylsiloxane). Such applications illustrate further uses of the invention.

SUMMARY OF THE INVENTION

With the foregoing in mind, the present invention advantageously provides an ordered array of magnetized nanorods, comprising a plurality of metallic nanorods generally cylindrical in shape and including a first metal portion coated with a positively charged polyelectrolyte and a second metal portion coated with an alkanethiolate. A layer of a hardened polymer holds the plurality of nanorods by each individual nanorod having said second metal portion embedded therein so that the first metal portion extends away from the layer of hardened polymer, and wherein said plurality of metallic nanorods is ordered in the array by having substantially all individual nanorods of the plurality of nanorods oriented generally parallel to each other. The ordered array preferably includes each individual nanorod having a length of between approximately 1 and 10 µm and a width or diameter of between approximately 20 to 200 nm. Most preferably, the ordered array of nanorods has an inter-nanorod spacing of between approximately 10 to 200 nm. A preferred first metal in the invention is nickel and a preferred second metal is gold.

Method aspects of the invention include a method of making an ordered array of magnetized nanorods. The method comprises electroforming a plurality of relatively high aspect ratio nanorods wherein each individual nanorod includes a portion electroformed of gold and a portion electroformed of nickel. The skilled should understand that the terms "electroforming" and "electrodeposition" are used synonymously herein. Following electroforming, the method includes modifying the plurality of nanorods so that in each individual nanorod the gold portion is modified to become hydrophobic and the nickel portion is modified to become hydrophilic. The method then calls for dispersing the plurality of modified nanorods on an interface between an aqueous phase and a non-aqueous phase so that each individual nanorod orients having the hydrophilic nickel portion in the aqueous phase extending away from the interface in a relatively perpendicular direction therefrom and having the hydrophobic gold portion in the non-aqueous phase extending away from the interface in a relatively perpendicular direction therefrom. Finally, the method comprises self-assembling the plurality of dispersed nanorods by adjusting ionic content in the aqueous phase so as to sufficiently influence repulsive forces between individual nanorods of the plurality of nanorods to thereby promote self-assembly of the plurality of nanorods into an ordered array wherein substantially all individual nanorods of the plurality are aligned generally parallel with each other along the interface.

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which:

FIG. 1 shows top plan and side elevation views of the nanorod array according to an embodiment of the present invention;

FIG. 2 illustrates electroforming or electrodeposition of the nanorods within pores of a membrane filter, preferably an aluminum oxide (alumina) membrane;

FIG. 3 is an electron micrograph view of nickel nanorods according to the invention;

FIG. 4 shows modification or derivatization of the nanorods according to the method of the invention; and FIG. 5 depicts polymerization of a non-aqueous phase to fix in place the ordered array of nanorods according to the invention.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description, and from the appended claims.

The general structure of the ordered array 10 of nanorods according to the present invention is shown in FIG. 1, which depicts side and top views of a representative self assembled array at a water/air interface. Magnetic nanorods 12 have been produced before, but they, and other particles with a high aspect ratio, such as a plates, have been generally ordered with the long dimension parallel to the interface surface. An important structural feature of the present invention, illustrated in FIG. 1, is that the particles are oriented perpendicular to the interface. The particles, termed herein "nanorods" 12, are generally cylindrical with a diameter ranging from approximately 20–200 nm, and a length of approximately from 1–10 μm inter-nanorod spacing of 10–200 nm is prefered in the ordered array. The force which drives the nanorods to the interface is the hydrophobic nature of one end of the nanorods (they are amphiphilic, in fact) and the force which causes self-assembly into an array is the mutual electrostatic repulsion between particles. A hexagonal close-packed array is expected to be the lowest energy configuration in the presence of repulsive interactions.

A method of making the nanorods includes producing of generally uniform high aspect ratio nanorods 12 modifying the nanorods such that one end becomes hydrophobic and the other end becomes hydrophillic; dispersing the modified nanorods at the interface 14 of an aqueous phase 16 and a water-immiscible non-aqueous phase 18 and self-assembling by controlling the order-inducing repulsive interactions between interfacial nanorods 12 until self assembly is achieved. The self-assembly may be monitored in situ as it occurs. Following completion of self-assembly, the array may be hardened in place by polymerization of the non-aqueous phase 18.

Production of nanorods 12 is preferably accomplished by electrochemical deposition, or electroforming, during which metallic nanorods are grown in the pores of commercially available alumina membrane filters as known to those skilled in the art. The process is generally illustrated in FIG. 2. First, a thin gold film is evaporated on one surface of an aluminum oxide alumina filter 20 that comprises 20–200 nm diameter pores. Following immersion in the appropriate electroplating bath, gold, is deposited in the pores. The process is repeated for nickel. The length of the rod is controlled by the electroplating time and current. The alumina membrane 20 template is then dissolved in base to yield free nanorods 12. FIG. 3 shows a sample of nickel nanowires grown according to the method of the invention. The skilled should recognize that in order to keep the aspect ratio at about 10:1 (length:diameter) it is preferable to plate for much shorter times than was done for making the example shown in FIG. 3.

Modification of nanorods. Rods 12 will be approximately half gold (inert) and half nickel (less inert). A native oxide layer will spontaneously form on the surface of the nickel portion 22 on exposure to air. The nanorods 12 are exposed to a solution of octadecanethiol in ethanol, which causes a layer of octadecanethiolate to spontaneously adsorb on the surface. The interaction of thiol with the gold portion 24 is strong, but with the nickel (oxide) portion it is weak. Thus, the thiol may be washed off the nickel portion 22. The purpose of the alkanethiol is to render the gold portion 24 of the nanorod 12 hydrophobic. On exposure of the modified, thiol-derivatized nanorods to an aqueous solution of positive polyelectrolyte, such as poly (diallyidimethylammonium chloride) (PDADMAC), the polyelectrolyte will adsorb to the nickel (oxide) portion 22 via electrostatic forces (metal oxide surfaces tend to be negative), rendering the nickel portion hydrophilic.

Dispersion of nanorods. After the previous step, the nanorods 12 will be amphiphilic (have hydrophobic and hydrophilic ends, much like a soap molecule). Thus, they will collect at an interface 14 between air and water, or between an aqueous phase 16 and a non-aqueuous water-immiscible phase 18 such as an organic solvent. An aqueous dispersion of nanorods 12 should be dispersible via gentle ultrasound. The fact that the nanorods 12 are positively charged at one end also aids in separating individual nanorods from each other. The hydrophilic ends will reside in the aqueous phase 16 and the hydrophobic ends will reside in the non-aqueous phase 18, be it an air or organic solvent phase, as depicted in FIG. 1 (the fact that the modified nanorods float upright on the water surface leads us to call them "nanobuoys"). The number of nanobuoys per unit area is controlled by the number of nanorods or by the area over which they are dispersed. The original alumina membranes 20 from which the nanorods 12 are templated have pore densities roughly similar to the targeted coverage for the nanobuoys.

Self-assembly of the ordered array by controlling repulsive interactions. Nanorods 12 will have weak intermolecular (van der Waals) interactions and somewhat stronger magnetic interactions that will tend to agglomerate them. Countering these attractive forces are strong, long-range electrostatic repulsive forces between the positively-charged nickel ends and the strong tendency for nanorods 12 to accumulate at the interface 14, where both hydrophilic and hydrophobic ends are in their preferred environments. Repulsive interactions are required to separate the nanorods 12 and to force them into the ordered array (the "self assembly" process). The magnitude of the repulsive forces depends on the strength of the electrostatic fields emanating from the Ni ends (charged) of the nanorods 12. These fields are controlled with the addition of salt (small ionic species) to the aqueous phase. At high salt concentration, the electric fields are substantially screened and the interactions are minimized. For example, the ranges of these fields in solution of $10^{-4}$ and $10^{-5}$ M NaCl are about 30 nm and 300 nm, respectively.

Monitoring self-assembly. The end product of the method is a relatively rugged material that is easily subjected to microscopy to infer ordering. The nanorods being ordered are of high refractive index, so for particle spacings that are close to or larger than the wavelength of light (e.g. 400 nm for a blue laser) it is possible to observe ordering in situ with the aid of a small laser directed upwards through the bottom of the container and perpendicular to the interface and to the self-ordering array, producing a diffraction pattern on a plane (screen) above the container. Diffraction patterns may be measured and converted to spacings between nanobuoys. Alternatively, diffraction patterns may be collected with a CCD and Fourier transformed to produce a real-space image of the array. It is assumed that a hexagonal close packed array will allow nanobuoys to space themselves as far apart from each other as possible, but other structures may also exist, particularly at the limit of very high and very low repulsions.

Hardening the system. Without some method for fixing the arrayed nanorods 12 in place the system would remain unstable. In order to capture the result of the self assembly, the final method step comprises a polymerizable monomer in the non-aqueous organic layer. Methyl methacrylate (MMA) is suitable, for example, as it forms an optically transparent polymer. A small amount of an appropriate azo initiator, of which there is a great variety commercially available, would allow near room temperature conversion of MMA to PMMA, fixing the nanorods in the manner depicted in FIG. 5 so that they are held in place in the ordered array.

Characterization. The fixed array may be imaged by scanning probe microscopy (atomic force or, for magnetic particles, magnetic force) to verify its structure, spacing, uniformity and the general quality of the ordered array 10. Additionally, further magnetic measurements, such as SQUID, may be used to further verify the quality of the product.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A method of making an ordered array of magnetized nanorods, the method comprising:
    electroforming a plurality of relatively high aspect ratio nanorods wherein each individual nanorod includes a portion electroformed of gold and a portion electroformed of nickel;
    modifying the plurality of nanorods so that in each individual nanorod the gold portion is modified to become hydrophobic and the nickel portion is modified to become hydrophilic;
    dispersing the plurality of modified nanorods on an interface between an aqueous phase and a non-aqueous phase so that each individual nanorod orients having the hydrophilic nickel portion in the aqueous phase extending away from the interface in a relatively perpendicular direction therefrom and having the hydrophobic gold portion in the non-aqueous phase extending away from the interface in a relatively perpendicular direction therefrom; and
    self-assembling the plurality of dispersed nanorods by adjusting ionic content in the aqueous phase so as to sufficiently control repulsive forces between individual nanorods of the plurality of nanorods to thereby promote self-assembly of the plurality of nanorods into an ordered array wherein substantially all individual nanorods of the plurality are aligned generally parallel with each other along the interface.

2. The method of claim 1, wherein electroforming further comprises electroforming the plurality of nanorods within pores of a membrane filter.

3. The method of claim 1, wherein electroforming further comprises electroforming the plurality of nanorods within pores of a membrane filter, the pores having diameters ranging in size from approximately 20 to 200 nm.

4. The method of claim 1, wherein each individual nanorod of the plurality of nanorods has a cylindrical shape having a diameter of between approximately 20 and 200 nm.

5. The method of claim 1, wherein each individual nanorod of the plurality of nanorods has a cylindrical shape having a length of between approximately 1 and 10 μm.

6. The method of claim 1, wherein electroforming further comprises electroforming the plurality of nanorods within pores of a membrane filter, followed by dissolving the membrane filter so as to release the plurality of formed nanorods.

7. The method of claim 1, wherein electroforming further comprises electroforming the plurality of nanorods within pores of an alumina membrane filter.

8. The method of claim 1, wherein electroforming further comprises electroforming the plurality of nanorods within pores of an alumina membrane filter, the pores having diameters ranging in size from approximately 20 to 200 nm.

9. The method of claim 1, wherein electroforming further comprises electroforming the plurality of nanorods within pores of an alumina membrane filter, followed by dissolving the alumina membrane filter so as to release the plurality of formed nanorods.

10. The method of claim 1, wherein modifying further comprises forming a surface layer of alkanethiolate on each individual nanorod of the plurality of nanorods.

11. The method of claim 10, wherein the alkanethiolate contains octadecanethiolate.

12. The method of claim 1, wherein modifying further comprises contacting the plurality of nanorods with a composition containing octadecanethiol and ethanol so as to form a surface layer of octadecanethiolate on each individual nanorod of the plurality of nanorods.

13. The method of claim 1, wherein modifying further comprises forming a surface layer of alkanethiolate on each individual nanorod of the plurality of nanorods, followed by washing off the surface layer of alkanethiolate from the nickel portion of each individual nanorod of the plurality of nanorods.

14. The method of claim 13, wherein the alkanethiolate contains octadecanethiolate.

15. The method of claim 13, wherein modifying further comprises contacting the plurality of nanorods with a composition containing a positively charged polyelectrolyte so as to form a surface layer of the polyelectrolyte on the washed off nickel portion of each individual nanorod of the plurality of nanorods.

16. The method of claim 15, wherein the positively charged polyelectrolyte contains poly(diallyldimethylammonium chloride).

17. The method of claim 1, wherein modifying further comprises contacting the plurality of nanorods with a composition containing octadecanethiol and ethanol so as to form a surface layer of octadecanethiolate on each individual nanorod of the plurality of nanorods, followed by washing off the surface layer of octadecanethiolate from the nickel portion of each individual nanorod of the plurality of nanorods.

18. The method of claim 17, wherein modifying further comprises contacting the plurality of nanorods with a composition containing a positively charged polyelectrolyte so as to form a surface layer of the polyelectrolyte on the washed off nickel portion of each individual nanorod of the plurality of nanorods.

19. The method of claim 18 wherein the positively charged polyelectrolyte contains poly(diallyldimethylammonium chloride).

20. The method of claim 1, wherein dispersing further comprises an aqueous phase consisting of water.

21. The method of claim 1, wherein dispersing further comprises a non-aqueous phase consisting of air.

22. The method of claim 1, wherein dispersing further comprises a non-aqueous phase consisting of a water-immiscible organic solvent.

23. The method of claim 1, wherein self-assembling further comprises adjusting ionic content with at least one salt.

24. The method of claim 23, wherein the at least one salt includes sodium chloride.

25. The method of claim 1, further comprising monitoring self-assembly by microscopic observation.

26. The method of claim 1, further comprising monitoring self-assembly by analyzing a diffraction pattern generated by passing a beam of laser light through the plurality of nanorods and generally perpendicularly to the interface.

27. The method of claim 26, wherein the beam of laser light consists of blue light of approximately 400 nm.

28. The method of claim 1, wherein following self-assembling the ordered array of magnetized nanorods has an inter-nanorod spacing of between approximately 10 to 200 nm.

29. An ordered array of magnetized nanorods, said ordered array made by the method of claim 1.

30. A method of making an ordered array of nanorods, the method comprising:
electroforming a plurality of relatively high aspect ratio nanorods wherein each individual nanorod includes a portion electroformed of a first metal and a portion electroformed of a second metal;
modifying the plurality of nanorods so that in each individual nanorod the first metal portion is modified to become hydrophobic and the second metal portion is modified to become hydrophilic;
dispersing the plurality of modified nanorods on an interface between an aqueous phase and a non-aqueous phase containing a water-immiscible polymerizable monomer so that each individual nanorod orients having the hydrophilic second metal portion in the aqueous phase extending away from the interface in a relatively perpendicular direction therefrom and having the hydrophobic first metal portion in the non-aqueous phase extending away from the interface in a relatively perpendicular direction therefrom; and
self-assembling the plurality of dispersed nanorods by adjusting ionic content in the aqueous phase so as to sufficiently control repulsive forces between individual nanorods of the plurality of nanorods to thereby promote self-assembly of the plurality of nanorods into an ordered array wherein substantially all individual nanorods of the plurality of dispersed nanorods are aligned generally parallel with each other along the interface.

31. The method of claim 30, wherein electroforming further comprises electroforming the plurality of nanorods within pores of a membrane filter.

32. The method of claim 30, wherein electroforming further comprises electroforming the plurality of nanorods within pores of a membrane filter, the pores having diameters ranging in size from approximately 20 to 200 nm.

33. The method of claim 30, wherein each individual nanorod of the plurality of nanorods has a cylindrical shape having a diameter of between approximately 20 and 200 nm.

34. The method of claim 30, wherein each individual nanorod of the plurality of nanorods has a cylindrical shape having a length of between approximately 1 and 10 µm.

35. The method of claim 30, wherein electroforming further comprises electroforming the plurality of nanorods within pores of a membrane filter, followed by dissolving the membrane filter so as to release the plurality of formed nanorods.

36. The method of claim 30, wherein electroforming further comprises electroforming the plurality of nanorods within pores of an alumina membrane filter.

37. The method of claim 30, wherein electroforming further comprises electroforming the plurality of nanorods within pores of an alumina membrane filter, the pores having diameters ranging in size from approximately 20 to 200 nm.

38. The method of claim 30, wherein electroforming further comprises electroforming the plurality of nanorods within pores of an alumina membrane filter, followed by dissolving the alumina membrane filter so as to release the plurality of formed nanorods.

39. The method of claim 30, wherein modifying further comprises forming a surface layer of alkanethiolate on each individual nanorod of the plurality of nanorods.

40. The method of claim 39, wherein the alkanethiolate contains octadecanethiolate.

41. The method of claim 30, wherein modifying further comprises contacting the plurality of nanorods with a composition containing octadecanethiol and ethanol so as to form a surface layer of octadecanethiolate on each individual nanorod of the plurality of nanorods.

42. The method of claim 30, wherein modifying further comprises forming a surface layer of alkanethiolate on each individual nanorod of the plurality of nanorods, followed by washing off the surface layer of alkanethiolate from the second metal portion of each individual nanorod of the plurality of nanorods.

43. The method of claim 42, wherein the alkanethiolate contains octadecanethiolate.

44. The method of claim 42, wherein modifying further comprises contacting the plurality of nanorods with a composition containing a positively charged polyelectrolyte so as to form a surface layer of the polyelectrolyte on the washed off second metal portion of each individual nanorod of the plurality of nanorods.

45. The method of claim 44, wherein the positively charged polyelectrolyte contains poly(diallyldimethylammonium chloride).

46. The method of claim 30, wherein modifying further comprises contacting the plurality of nanorods with a composition containing octadecanethiol and ethanol so as to form a surface layer of octadecanethiolate on each individual nanorod of the plurality of nanorods, followed by washing off the surface layer of octadecanethiolate from the second metal portion of each individual nanorod of the plurality of nanorods.

47. The method of claim 46, wherein modifying further comprises contacting the plurality of nanorods with a composition containing a positively charged polyelectrolyte so as to form a surface layer of the polyelectrolyte on the washed off second metal portion of each individual nanorod of the plurality of nanorods.

48. The method of claim 47, wherein the positively charged polyelectrolyte contains poly(diallyldimethylammonium chloride).

49. The method of claim 30, wherein dispersing further comprises an aqueous phase consisting of water.

50. The method of claim 30, wherein dispersing further comprises a non-aqueous phase consisting of air.

51. The method of claim 30, wherein dispersing further comprises a non-aqueous phase consisting of a water-immiscible organic solvent.

52. The method of claim 30, wherein self-assembling further comprises adjusting ionic content with at least one salt.

53. The method of claim 52, wherein the at least one salt includes sodium chloride.

54. The method of claim 30, further comprising monitoring self-assembly by microscopic observation.

55. The method of claim 30, further comprising monitoring self-assembly by analyzing a diffraction pattern generated by passing a beam of laser light through the plurality of nanorods and generally perpendicularly to the interface.

56. The method of claim 55, wherein the beam of laser light consists of blue light of approximately 400 nm.

57. The method of claim 30, wherein following self-assembling the ordered array of magnetized nanorods has an inter-nanorod spacing of between approximately 10 to 200 nm.

58. The method of claim 30, wherein the polymerizable monomer comprises methyl methacrylate.

59. The method of claim 30, further comprising polymerizing the polymerizable monomer following self-assembling.

60. The method of claim 30, further comprising polymerizing the polymerizable monomer by addition of an effective azo initiator following self-assembling.

61. The method of claim 30, wherein said first metal and said second metal are different metals, said first metal being selected from gold, silver, copper, chromium, and platinum, and said second metal being selected from nickel, cobalt, iron, chromium, alloys thereof, and a platinum alloy.

62. An ordered array of magnetized nanorods, said ordered array comprising:
a plurality of metallic nanorods generally cylindrical in shape and including a nickel portion coated with a positively charged polyelectrolyte and a gold portion coated with an alkanethiolate; and
a layer of a hardened polymer wherein each individual nanorod of the plurality is held by having said gold portion embedded therein so that the nickel portion extends approximately perpendicularly away from the layer of hardened polymer, and wherein said plurality of metallic nanorods is ordered in the array by having substantially all individual nanorods of the plurality of nanorods oriented approximately parallel to each other.

63. The ordered array of claim 62, wherein each individual nanorod of the plurality of nanorods has a length of between approximately 1 and 10 μm.

64. The ordered array of claim 62, wherein each individual nanorod of the plurality of nanorods has a diameter of between approximately 20 to 200 nm.

65. The ordered array of claim 62, wherein each individual nanorod of the plurality of nanorods has a length of between approximately 1 and 10 μm and a diameter of between approximately 20 to 200 nm.

66. The ordered array of claim 62, further comprising an inter-nanorod spacing of between approximately 10 to 200 nm.

67. An ordered array of nanorods, said ordered array comprising:
a plurality of metallic nanorods generally cylindrical in shape and including a first metal portion coated with a positively charged polyelectrolyte and a second metal portion coated with an alkanethiolate; and
a layer of a hardened polymer wherein each individual nanorod of the plurality is held by having said second metal portion embedded therein so that the first metal portion extends approximately perpendicularly away from the layer of hardened polymer, and wherein said plurality of metallic nanorods is ordered in the array by having substantially all individual nanorods of the plurality of nanorods oriented approximately parallel to each other.

68. The ordered array of claim 67, wherein each individual nanorod of the plurality of nanorods has a length of between approximately 1 and 10 μm.

69. The ordered array of claim 67, wherein each individual nanorod of the plurality of nanorods has a diameter of between approximately 20 to 200 nm.

70. The ordered array of claim 67, wherein each individual nanorod of the plurality of nanorods has a length of between approximately 1 and 10 μm and a diameter of between approximately 20 to 200 nm.

71. The ordered array of claim 67, further comprising an inter-nanorod spacing of between approximately 10 to 200 nm.

72. The ordered array of claim 67, wherein said first metal consists of nickel and wherein said second metal consists of gold.

73. The ordered array of claim 67, wherein said first metal is selected from nickel, cobalt, iron, chromium, and alloys thereof.

74. The ordered array of claim 67, wherein said second metal is selected from gold, silver, copper, chromium, platinum, and alloys thereof.

75. The ordered array of claim 67, wherein said first metal comprises an alloy of platinum.

76. The ordered array of claim 67, wherein said first metal and said second metal are different metals, said first metal being selected from gold, silver, copper, chromium, and platinum, and said second metal being selected from nickel, cobalt, iron, chromium, alloys thereof, and a platinum alloy.

* * * * *